(12) United States Patent
Jang et al.

(10) Patent No.: US 11,610,180 B2
(45) Date of Patent: Mar. 21, 2023

(54) LOGISTICS INFORMATION MANAGING METHOD AND ELECTRONIC APPARATUS PERFORMING THE SAME

(71) Applicant: Coupang Corp., Seoul (KR)

(72) Inventors: Dae Yong Jang, Seoul (KR); Sang Min Jun, Seoul (KR); Yong Jin Kim, Seoul (KR); Sun Young Hong, Seoul (KR); Hyun Yop Jung, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/171,589

(22) Filed: Feb. 9, 2021

(65) Prior Publication Data

US 2022/0188748 A1    Jun. 16, 2022

(30) Foreign Application Priority Data

Dec. 16, 2020   (KR) .................. 10-2020-0176810

(51) Int. Cl.
*G06Q 10/087* (2023.01)

(52) U.S. Cl.
CPC .................. *G06Q 10/087* (2013.01)

(58) Field of Classification Search
CPC .. G06Q 10/087; G06Q 50/28; G06Q 10/0875; G06Q 10/06312; G06Q 10/06316; G06Q 10/0633; G06Q 10/0637
USPC .......................................................... 705/28
See application file for complete search history.

(56) References Cited

U.S. PATENT DOCUMENTS

| | | | | |
|---|---|---|---|---|
| 8,620,707 | B1 * | 12/2013 | Belyi | G06Q 10/087 |
| | | | | 705/7.12 |
| 10,504,061 | B1 * | 12/2019 | Shi | G06Q 30/0205 |
| 10,796,278 | B1 * | 10/2020 | Wintz | G06Q 10/087 |
| 2017/0157648 | A1 * | 6/2017 | Wagner | B65G 47/34 |
| 2017/0330135 | A1 * | 11/2017 | Taylor | G06Q 10/087 |
| 2018/0025310 | A1 | 1/2018 | Gabbai | |
| 2020/0171548 | A1 * | 6/2020 | Li | B07C 3/02 |
| 2021/0150460 | A1 * | 5/2021 | Jiang | G06Q 10/087 |
| 2021/0150468 | A1 * | 5/2021 | Wright | G06Q 10/087 |
| 2021/0158278 | A1 * | 5/2021 | Bogolea | G06T 7/0008 |

(Continued)

FOREIGN PATENT DOCUMENTS

| | | |
|---|---|---|
| CN | 112053119 A | 12/2020 |
| JP | H05147703 A | 6/1993 |

(Continued)

OTHER PUBLICATIONS

Jul. 5, 2021—(JP) Office Action Appn No. 2021-005714.
Aug. 25, 2021—(KR) Office Action Appn 10-2021-0098433.
Sep. 7, 2021—International Search Report Appn PCT/KR2021/000052.

*Primary Examiner* — Garcia Ade
(74) *Attorney, Agent, or Firm* — Banner & Witcoff, Ltd.

(57) ABSTRACT

According to various example embodiments, a logistics information managing method of an electronic apparatus may include setting an item attribute-related condition corresponding to a fulfillment center, identifying one or more attribute types of a first item received in the fulfillment center, determining, based on the item attribute-related condition, one of the one or more attribute types of the first item to be a representative attribute of the first item, and providing candidate display position information for the first item based on the representative attribute. In addition, other embodiments are also possible.

19 Claims, 8 Drawing Sheets

(56) References Cited

U.S. PATENT DOCUMENTS

| | | | |
|---|---|---|---|
| 2021/0192435 A1* | 6/2021 | Fernandes | G06Q 30/0202 |
| 2021/0221613 A1* | 7/2021 | Liu | G06F 16/29 |
| 2021/0256459 A1* | 8/2021 | Hong | G06F 3/04842 |

FOREIGN PATENT DOCUMENTS

| | | |
|---|---|---|
| JP | 2003-128213 A | 5/2003 |
| JP | 2018180821 A | 11/2018 |
| KR | 1020150053443 A | 5/2015 |
| KR | 1020180073221 A | 7/2018 |
| KR | 10-1953069 B1 | 2/2019 |
| KR | 1020190031526 A | 3/2019 |
| KR | 10-1983018 B1 | 5/2019 |
| KR | 10-2020-0044088 A | 4/2020 |
| KR | 1020200106323 A | 9/2020 |

\* cited by examiner

| Type | Exposed name | Abbr. | Priority | Zone management setting exposure | Warehousing filter setting exposure | Status | Date of registration | Registrant |
|---|---|---|---|---|---|---|---|---|
| Tyoe A | PRIME | P | 0 | O | O | Used | 2020-09-10 14:43 | John |
| Tyoe B | PRIME_1 | P1 | 0 | | | Used | 2020-09-10 14:44 | John |
| Tyoe C | PRIME_2 | P2 | 0 | | | Used | 2020-09-10 14:44 | John |
| Tyoe D | PRIME_3 | P3 | 0 | | | Used | 2020-09-10 14:46 | John |
| Tyoe E | HIGH_RISK | H | 1 | | | Used | 2020-09-10 14:47 | John |
| Tyoe F | FLOW_RACK | FR | 2 | O | O | Unused | - | |
| Tyoe G | SIOC | S | 3 | | | Unused | - | |

Priority change

| Type | Priority change |
|---|---|
| Type A | ◊ ◊ |
| Type E | ◊ ◊ |

[ Change ]

| Display area | | Temperature type | | SKU type | | | |
|---|---|---|---|---|---|---|---|
| All ⌄ | | Temperature type ⌄ | | SKU type ⌄ | | | 🔍 Search |

― 502

| Display area | Temperature setting | Temperature setting change | SKU type | SKU type change | Date of creation | Date of modification | Modifier |
|---|---|---|---|---|---|---|---|
| DA | Room temperature | RT ⌄ Done | Prime | Prime ⌄ Done | 2020/09/03 14:56 | 2020/09/03 15:45 | 2369 |
| XM | Room temperature | RT ⌄ Done | Normal | Normal ⌄ Done | 2020/08/05 10:38 | 2020/08/05 10:38 | system |
| QQ | Room temperature | RT ⌄ Done | Normal | Normal ⌄ Done | 2020/06/08 03:24 | 2020/06/08 03:24 | system |
| VP | Room temperature | RT ⌄ Done | Normal | Normal ⌄ Done | 2020/05/25 23:24 | 2020/05/25 23:24 | system |
| AP | Room temperature | RT ⌄ Done | Normal | ⌄ Done | 2019/11/13 00:17 | 2019/11/13 09:35 | 2369 |

503

504

FR(FLOW_RACK)
✓ PRIME
P1(PRIME_1)
P2(PRIME_2)
P3(PRIME_3)
H(PRIME_HIGH_RISK)

FIG. 6

| Filter type | Applying method | Target for applying | | Used or not |
|---|---|---|---|---|
| SKU level | : | □ S  □ A  □ B  □ C  □ N | | Unused ∨ |
| SKU storage temperature | : | | | Unused ∨ |
| Volume | = ∨ | | mm³ | Unused ∨ |
| Weight | = ∨ | | | Unused ∨ |
| Length of one side | = ∨ | | mm | Unused ∨ |
| Length of all sides | = ∨ | | mm | Unused ∨ |
| Unmeasured SKU | : | Used | | Unused ∨ |
| First-time received unmeasured SKU | : | Used | | Unused ∨ |
| Problem handling | : | Used | | Unused ∨ |
| SKU attribute | : | | | Unused ∨ |
| Transfer distribution | : | FR(FLOW_RACK)<br>✓ PRIME<br>P1(PRIME_1)<br>P2(PRIME_2)<br>P3(PRIME_3)<br>H(PRIME_HIGH_RISK) | | Unused ∨ |
| RFM receipt | : | | | Unused ∨ |

— 604

Done

LOGISTICS INFORMATION MANAGING METHOD AND ELECTRONIC APPARATUS PERFORMING THE SAME

BACKGROUND

Technical Field

Example embodiments of the present disclosure relate to a logistics information managing method and an electronic apparatus performing the same.

Description of the Related Art

As the use of the Internet becomes familiar, the e-commerce market is expanding. Transactions in the e-commerce market take place online through a network, and products that have been traded in e-commerce may be delivered to a destination set by a customer through a delivery service. As e-commerce expands, a purchase brokerage service that mediates transactions between a seller and a buyer and provides the delivery service is also being activated.

In the purchase brokerage service, shortening the time required for an item to reach a buyer from a seller is the key to satisfying customer needs. To this end, a logistics management system that provides the purchase brokerage service secures as many fulfillment centers as possible to shorten delivery time. Also, there is a desire for various methods to efficiently manage logistics items.

SUMMARY

Technical Goals

Fulfillment centers managed in a logistics management system may have different scales and characteristics and thus, may handle different attribute types of items. For example, some fulfillment centers may handle items classified as fresh products, and others may not. In some fulfillment centers, specific items may be handled separately from other items based on a product price. Also, in some fulfillment centers, items may be classified and managed only based on whether they are classified as dangerous substances instead of the product price.

As described above, different attribute types of items may be handled and managed by the fulfillment centers. Accordingly, the logistics management system needs to set a standard corresponding to each of the fulfillment centers and manage the fulfillment centers according to the set condition.

Example embodiments of the present disclosure provide a method and apparatus for setting an item attribute-related condition for each fulfillment center to effectively manage items based on attributes of the items.

Technical Solutions

According to an aspect, there is provided a logistics information managing method of an electronic apparatus, the logistics information managing method including setting an item attribute-related condition corresponding to a fulfillment center, identifying one or more attribute types of a first item received in the fulfillment center, determining, based on the item attribute-related condition, one of the one or more attribute types of the first item to be a representative attribute of the first item, and providing candidate display position information of or for the first item based on the representative attribute.

According to another aspect, there is also provided an electronic apparatus including a database, a communication module, and a processor, wherein the processor is set to set an item attribute-related condition corresponding to a fulfillment center, identify one or more attribute types of a first item received in the fulfillment center, determine a representative attribute among the one or more attribute types of the first item based on the item attribute-related condition, and provide candidate display position information of the first item corresponding to the representative attribute based on the item attribute-related condition.

According to another aspect, there is also provided a non-transitory computer-readable recording medium including a computer program for performing a logistics information managing method, the logistics information managing method including setting an item attribute-related condition corresponding to a fulfillment center, identifying one or more attribute types of a first item received in the fulfillment center, determining, based on the item attribute-related condition, one of the one or more attribute types of the first item to be a representative attribute of the first item, and providing candidate display position information of the first item based on the representative attribute.

Effects

According to example embodiments of the present disclosure, it is possible to provide a logistics management system that individually sets item attribute-related conditions based on attributes of a plurality of fulfillment centers and provide information such that an item is efficiently handled at each stage of logistics management based on the set condition.

Through this, it is possible to efficiently move and store items, which may effectively shorten a delivery time and reduce a workload of an operator related to displaying and picking tasks.

DETAILED DESCRIPTION

The terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may include the following meanings: A alone; B alone; C alone; both A and B together; both A and C together; both B and C together; and all three of A, B, and C together.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, example embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present disclosure will be described with reference to the drawings.

In describing the example embodiments, descriptions of technical contents that are well known in the art to which the present disclosure belongs and are not directly related to the present specification will be omitted. This is to more clearly communicate without obscure the subject matter of the present specification by omitting unnecessary description.

For the same reason, in the accompanying drawings, some components are exaggerated, omitted or schematically illustrated. In addition, the size of each component does not fully reflect the actual size. The same or corresponding components in each drawing are given the same reference numerals.

Advantages and features of the present disclosure and methods of achieving them will be apparent from the following example embodiments that will be described in more detail with reference to the accompanying drawings. It should be noted, however, that the present disclosure is not limited to the following example embodiments, and may be implemented in various forms. Accordingly, the example embodiments are provided only to disclose the present disclosure and let those skilled in the art know the category of the present disclosure. In the drawings, embodiments of the present disclosure are not limited to the specific examples provided herein and are exaggerated for clarity. The same reference numerals or the same reference designators denote the same elements throughout the specification.

At this point, it will be understood that each block of the flowchart illustrations and combinations of flowchart illustrations may be performed by computer program instructions. Since these computer program instructions may be mounted on a processor of a general purpose computer, special purpose computer, or other programmable data processing equipment, those instructions executed through the computer or the processor of other programmable data processing equipment may create a means to perform the functions be described in flowchart block(s). These computer program instructions may be stored in a computer usable or computer readable memory that can be directed to a computer or other programmable data processing equipment to implement functionality in a particular manner, and thus the computer usable or computer readable memory. It is also possible for the instructions stored in to produce an article of manufacture containing instruction means for performing the functions described in the flowchart block(s). Computer program instructions may also be mounted on a computer or other programmable data processing equipment, such that a series of operating steps may be performed on the computer or other programmable data processing equipment to create a computer-implemented process to create a computer or other programmable data. Instructions for performing the processing equipment may also provide steps for performing the functions described in the flowchart block(s).

In addition, each block may represent a portion of a module, segment, or code that includes one or more executable instructions for executing a specified logical function(s). It should also be noted that in some alternative implementations, the functions noted in the blocks may occur out of order. For example, the two blocks shown in succession may in fact be executed substantially concurrently, or the blocks may sometimes be executed in the reverse order, depending on the corresponding function.

Figure 1:
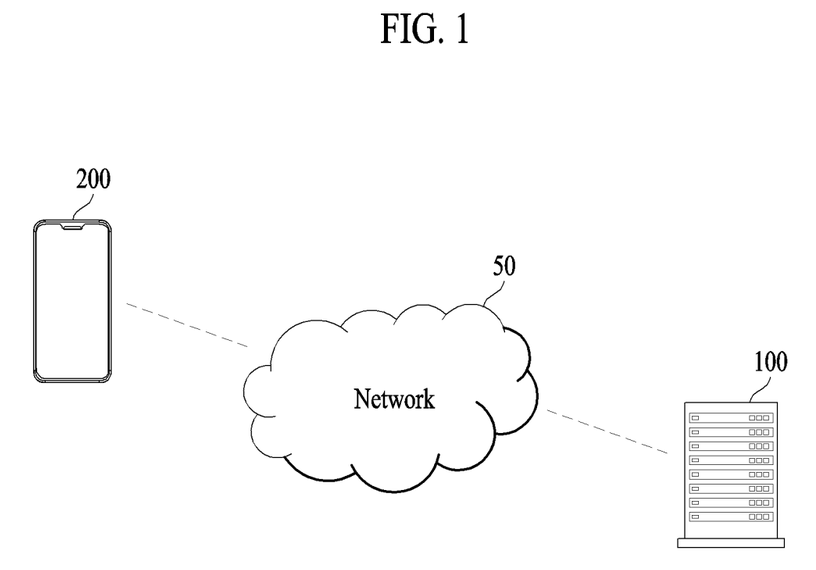
FIG. 1 is a block diagram illustrating a logistics management system according to various example embodiments of the present disclosure.

FIG. 1 is a block diagram illustrating a logistics management system according to various example embodiments of the present disclosure.

According to various example embodiments, a logistics management system may include an electronic apparatus 100 (e.g., server), a user terminal 200, and a network 50.

The electronic apparatus 100 (e.g., server) may be a device for performing various processes for logistics management and perform, for example, displaying of items received in a fulfillment center, stock management, transfer management of items in the fulfillment center, or task processing management for at least one of a picking task, a sorting task, and a packing task of items.

The electronic apparatus 100 may include a plurality of computer systems or computer software implemented as a network server, and may provide various information by configuring the information into a web page. For example, the electronic apparatus 100 may refer to a computer system and computer software that is connected to a sub-device capable of communicating with another network server through a computer network such as an intranet or the Internet, receives a task performance request, performs a corresponding task, and provides a result of the task. In addition, the electronic apparatus 100 may be understood as broad concepts including a series of application programs that can operate on a network server and various databases built therein. The electronic apparatus 100 may be implemented using a network server program that is provided in various ways based on an operating system such as DOS, Windows, Linux, UNIX, or MacOS, for example.

The network 50 may serve to connect the electronic apparatus 100 and the user terminal 200, or the electronic apparatus 100 and an external device (not shown). For example, the network 50 may provide an access path so that the user terminal 200 is connected to the electronic apparatus 100 to transmit and receive packet data.

According to an example embodiment of the present disclosure, operations of a logistics information management system may be implemented through the electronic apparatus 100. Also, the user terminal 200 may be connected to the logistics information management system through the network 50. The electronic apparatus 100 may store information received from the user terminal 200 in a database (e.g., a database 120 of FIG. 8), or provide information stored in the database to the user terminal 200.

According to another example embodiment, a logistics information management system may be implemented through the user terminal 200. For example, a user may install and use the logistics information management system in a form of an application in the user terminal 200 through the network 50.

The logistics information management system according to various example embodiments may be implemented as a single physical device, or may be implemented as a plurality of physical devices combined organically. For example, some of the components included in the logistics information management system may be implemented as one physical device, and some of the components included in the logistics information management system may be implemented as another physical device.

For example, one physical device may be implemented as a part of the electronic apparatus 100, and another physical device may be implemented as a part of the user terminal 200 or a part of an external device (not shown). In some cases, components included in the logistics information management system may be distributed and arranged in different physical devices. The distributed components may be organically combined to perform functions and operations of the logistics information management system.

Figure 2:
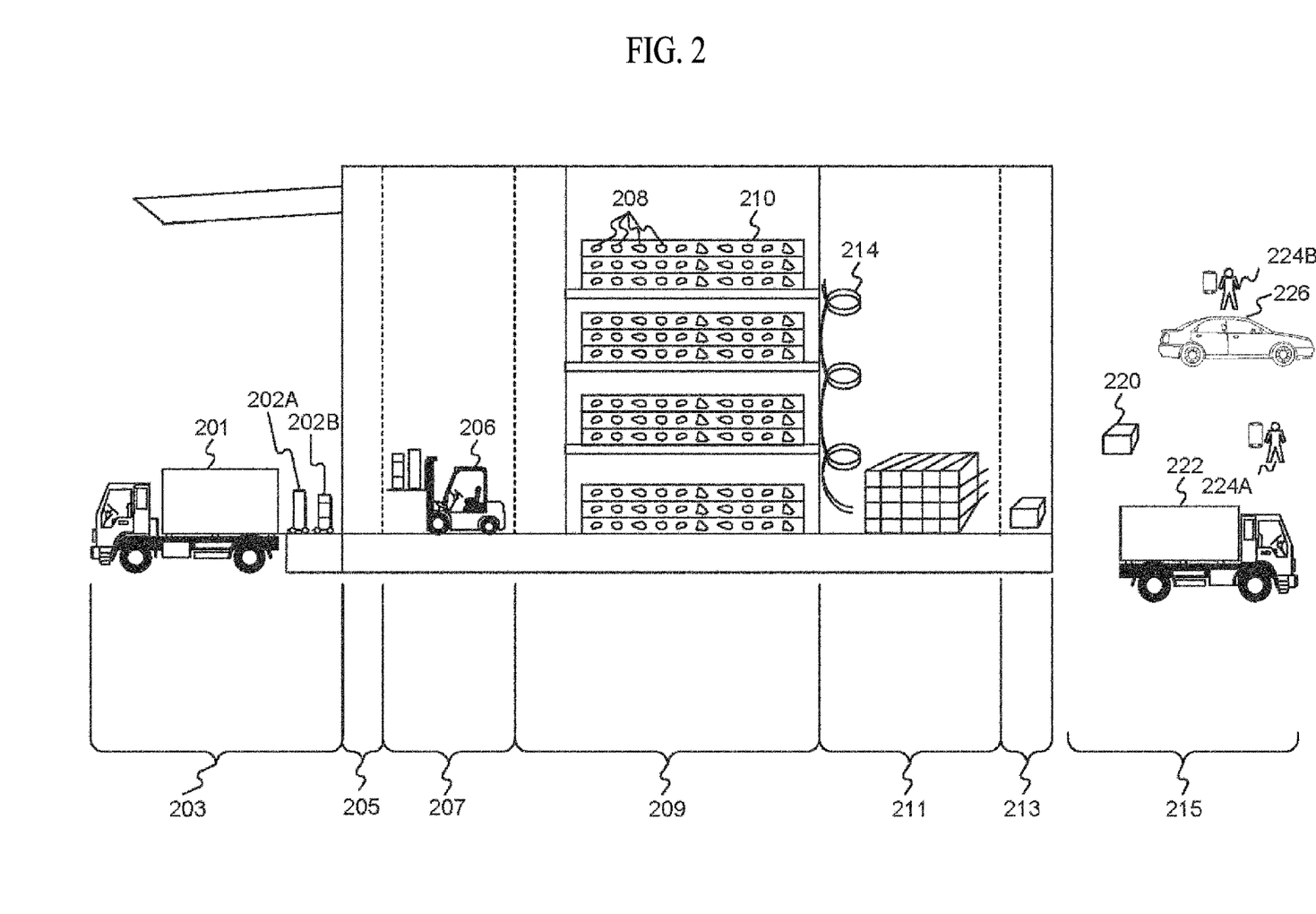
FIG. 2 is a diagram illustrating a logistics processing procedure performed in a logistics management system according to an example embodiment of the present disclosure.

FIG. 2 is a diagram illustrating a logistics processing process in a logistics management system according to an example embodiment of the present disclosure.

A fulfillment center (FC) may correspond to a warehouse area in which items (e.g., products, a stock keeping unit (SKU)) to be delivered to purchasers are stored and managed. For example, as illustrated in FIG. 2, the FC may be divided into a plurality of zones 203, 205, 207, 209, 211, 213, and 215. The zones may be virtual separated spaces for explaining a series of handling processes for receiving, storing, relocating, retrieving, sorting, shipping, and delivering items. As would be apparent to those skilled in the art, at least some of the above-described plurality of zones may be omitted, further divided, or changed within the scope of various embodiments of the present disclosure.

A schematic flow of a logistics processing process according to example embodiments will be described with reference to FIG. 2. Items provided from sellers may be received at a first zone 203 (e.g., inbound zone) of the FC. The received items may be transferred through a second zone 205 (e.g., buffer zone) and a third zone 207 (e.g., drop zone) to a fourth zone 209 (e.g., picking zone) so as to be stored. In response to an order for a specific item being received from a purchaser, items picked from the fourth zone 209 may be accommodated in a tote (or tote box) and transmitted to a fifth zone 211 (e.g., packing zone) through a predetermined carrier 214 for packaging. The items packed in the fifth zone 211 may be stored in a sixth zone 213 (e.g., hub zone) to be shipped (outbound) by a courier. The items may be delivered from a seventh zone 215 (e.g., camp zone) to respective destinations. In some cases, at least a portion of the aforementioned processes (e.g., the stowing process in the second zone 205, the packing process in the fifth zone 211, etc.) may not be performed on items. In such cases, the items may be shipped to a purchaser through another path (e.g., transfer to another fulfillment center after being received in the first zone 203).

Specifically, in the first zone 203, items 202A and 202B received from a seller may be received in the FC. The seller may transmit the items 202A and 202B to the FC using transportation, for example, a truck 201. In the first zone 203, the operator may identify a type of the received item, a quantity of the received item, whether the item is damaged, and the like and provide related information to the user terminal 200 (or the electronic apparatus 100). For example, the operator may transmit only an item satisfying a predetermined condition to the second zone 205.

Meanwhile, in a step of unloading the items from the truck, a step of inspecting whether the items are damaged, or a step of receiving the items in the FC, the operator may identify attribute information of the corresponding item and transfer the item by classifying the item based on the attribute information. When the item corresponds to a target to be transferred, the item is transmitted to a separate zone for performing a transfer classification task. When the item corresponds to a non-transfer target, the item may be transmitted to the second zone 205. Even when the item corresponds to a non-transfer target, the operator may transfer the item to the second zone 205 by storing the item in a tote separated based on an attribute of each item so as not to be mixed with other items.

The second zone 205 may correspond to a space that serves as a temporary storage for the fourth zone 209 (e.g., picking zone). For example, when an item of a quantity greater than or equal to an expected quantity to be ordered is stored in the fourth zone 209, and when an item of the same type is additionally received, the corresponding items may be temporarily stored in the second zone 205. When an additional storage of the item is requested in the fourth zone 209, the operator may move the items stored in the second zone 205 to the third zone 207, and then move the items moved to the third zone 207 to the fourth zone 209 again. The relocating task may be performed using, for example, a forklift 206. In some cases, the second zone 205 may not be provided separately based on a type of a fulfillment center.

The third zone 207 may correspond to a place in which the items are stored until the items are placed in the fourth zone 209. In the third zone 207, the operator may identify (e.g., scan) identification information (e.g., barcode) of the items using the user terminal 200 and transfer the items to the fourth zone 209. The items moved to the fourth zone 209 may be placed in predetermined storage areas (e.g., shelves, boxes, totes, refrigerators, freezers, etc.) of the fourth zone 209.

For example, the fourth zone 209 may include a plurality of floors, each having a display area 210. In the fourth zone 209, the operator may receive task instruction information indicating that items 208 are to be placed in a predetermined location of the display area 210 through the user terminal 200 and display (place) the items 208 in the predetermined location of the display area 210 based on the task instruction information. For example, the operator may identify identification information (e.g., barcode) of the items 208 to be placed using the user terminal 200 and identify identification information (e.g., barcode) corresponding to the predetermined location of the display area 210 in which the items 208 are to be placed. As such, the operator may provide information associated with a location in which the items 208 are to be placed in the fourth zone 209 to the user terminal 200 or the electronic apparatus 100.

Meanwhile, at least some of the items placed in the fourth zone 209 may be picked based on picking task instruction information generated in response to an order request from a purchaser and accommodated in at least one tote to be moved. For example, in the fourth zone 209, the operator may receive task instruction information indicating to retrieve and pick a portion of the items placed in the display area 210 through the user terminal 200 and perform a picking task based on the task instruction information.

The tote including the picked item may be moved to a destination where a subsequent task is to be performed. The tote may be moved to, for example, a task zone (e.g., a station) in which a packing task is to be performed or a task zone in which a sorting task is to be performed. The electronic apparatus 100 may determine a destination to which the tote is to be moved based on an attribute of the item included in the tote and provide related information to the operator.

For example, the operator may deliver the tote to a predetermined destination of the fifth zone 211 using the predetermined carrier 214 (e.g., conveyor belt, elevator, cart, hand truck, dolly, etc.).

The fifth zone 211 may include a task zone (e.g., a station) in which a packing task is performed using boxes, bags, or plastic to deliver the item received from the fourth zone 209 to the purchaser. Also, the fifth zone 211 may further include a task zone in which a sorting task of the item is performed before the packing task is performed.

In the sixth zone 213, a packed item 220 transferred from the fifth zone 211 may be temporarily stored. The packed item stored in the sixth zone 213 may be transferred to the seventh zone 215 based on an address. In the seventh zone 215, couriers 224A and 224B may deliver the packed item 220 to a destination of the address using various types of transportations 222 and 226.

Figure 3:
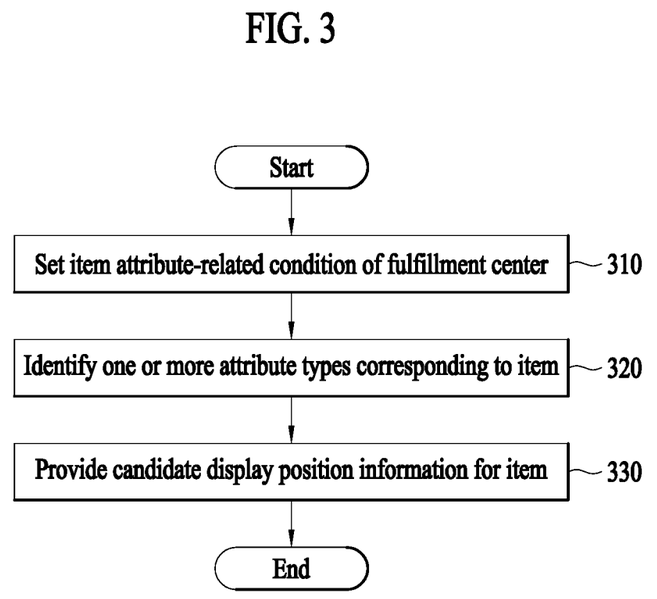
FIG. 3 is a flowchart illustrating a logistics information managing method according to an example embodiment of the present disclosure.

FIG. 3 is a flowchart illustrating a logistics information managing method according to an example embodiment of the present disclosure.

The electronic apparatus 100 (e.g., server) according to various example embodiments may use attribute information of an item (e.g., product or SKU) handled in a fulfillment center to provide predetermined management information associated with transport or storage of the item in steps of various tasks performed in the fulfillment center. The "item" mentioned herein may correspond to any one of a product or a SKU. The "SKU" may correspond to a basic unit for selling or managing predetermined item(s).

Referring to FIG. 3, in operation 310, a logistics information managing method according to an example embodiment of the present disclosure may set an item attribute-related condition corresponding to a specific fulfillment center.

The electronic apparatus 100 may set different item attribute-related conditions to be managed by a plurality of fulfillment centers for individual fulfillment centers.

The individual fulfillment centers may have different methods of handling or storing a logistics item based on a size or operation purpose of the corresponding fulfillment center. For example, as a base fulfillment center, a fulfillment center may receive some items, which are to be received in small fulfillment centers, in place of the small fulfillment centers, and then transfer the items to other nearby fulfillment centers through a predetermined handling process. In addition, a fulfillment center may have a facility in which at least one of processes for receiving, transporting, displaying, or packing an item is automatically performed by a machine without inputting manpower while another fulfillment center may not have such an automated facility. Also, a size of one storage (display) area of a fulfillment center may be larger than a size of a storage (display) area of another fulfillment center, so that the fulfillment center is required to manage items by classifying the items based on a more detailed attribute. As described above, since fulfillment centers have different operation methods and operation scales, a different item attribute-related condition may be set for each of the fulfillment centers.

In addition, even in one fulfillment center, in a case in which an operation situation changes, for example, when a legal standard is changed or a new automation facility is to be introduced, an item attribute-related condition to be managed in the corresponding fulfillment center may be changed for management.

According to various example embodiments of the present disclosure, the electronic apparatus 100 may provide a system for setting item attribute-related conditions for individual fulfillment centers in units of a fulfillment center or changing the setting.

For example, the electronic apparatus 100 may determine predetermined item attribute types to be managed in a specific fulfillment center through a user (e.g., manager) input reception.

The item attribute types may include at least one of, for example, an item packing task-related attribute (e.g., an attribute regarding whether an item is a target for ship in original carton (SIOC), etc.), an item transport task-related attribute (e.g., an attribute regarding whether an item is a target to use flow rack, etc.), an item sales-related attribute (e.g., an attribute regarding whether an item is a high-selling item, an attribute regarding whether an item has a high selling price, etc.), an item size or weight-related attribute (e.g., an attribute regarding whether an item has a specification exceeding specified thickness, width, height, and/or weight), and an item storage temperature-related attribute (e.g., whether to be stored at room temperature, refrigerated, or frozen, etc.). In addition, the item attribute type may also include an attribute regarding whether an item contains dangerous substances or whether an item requires separate legal management such as livestock products. Further, a new item attribute field not mentioned above may be additionally set based on a setting input of a user (e.g., manager).

Meanwhile, the electronic apparatus 100 may set detailed conditions for item attribute types to be managed in the fulfillment center. For example, the electronic apparatus 100 may determine a task stage (e.g., a stage of warehousing, a stage of displaying in a buffer zone, a stage of displaying in a picking zone, etc.) to which the item attribute-related condition is applied and determine priorities of the item attribute types. Also, the electronic apparatus 100 may map each of the display areas in the fulfillment center to at least one item attribute type and provide item display-related information such that only an item having a corresponding attribute type is displayed in each of the display areas. A method of setting an item attribute-related condition in the electronic apparatus 100 according to various example embodiments of the present disclosure will be described in greater detail with reference to FIGS. 4 through 6.

Next, in operation 320, the electronic apparatus 100 may identify at least one attribute type corresponding to a specific item.

According to an example embodiment, the electronic apparatus 100 may identify an attribute of each item based on identification information (e.g., a barcode, a quick response (QR) code, etc.) attached to an exterior of the corresponding item. For example, the electronic apparatus 100 may include attribute information corresponding to an identification number in a database or receive the attribute information from another electronic apparatus (e.g., another server). Through this, the electronic apparatus 100 may identify an attribute type of the item.

According to another example embodiment, the electronic apparatus 100 may identify an attribute (e.g., a size-related attribute, a weight-related attribute, etc.) of the item in a manner of measuring a size or weight of each item.

Meanwhile, one item may include a plurality of attributes. For example, a certain item (e.g., a first item) may correspond to an SIOC article (e.g., a first attribute) that does not require a separate repackaging task as a packing task-related attribute type and correspond to an attribute article (e.g., a second attribute) that requires a separate legal management such as toxic substance, livestock products, and the like.

When the item has the plurality of attributes, the electronic apparatus 100 may determine one of the attributes to be a representative attribute and manage the item using the representative attribute. For example, the electronic apparatus 100 may determine a representative attribute of the item based on the item attribute-related condition set in operation 310. The item attribute-related condition set in operation 310 may include priority information for identifying priorities of a plurality of attribute types when one item corresponds to the plurality of attribute types. For example, when the first item includes the first attribute and the second attribute, and when the first attribute has a higher priority than that of the second attribute, the electronic apparatus 100 may determine the second attribute to be a representative attribute of the first item.

Next, in operation 330, the electronic apparatus 100 may provide candidate display position information for the item. For example, the electronic apparatus 100 may provide candidate display position information for displaying the item based on at least one attribute, particularly, a representative attribute of each item.

As described above, the electronic apparatus 100 according to various example embodiments may identify one or more attribute types corresponding to the specific item, determine a representative attribute of the item among the attribute types, and provide transport destination information and display position information of or for the item based on the representative attribute.

Meanwhile, in the example embodiment, when providing the candidate display position information, the electronic apparatus 100 may provide the candidate display position information including a display position to which the attribute of the item is allocated. For example, the electronic apparatus 100 may allocate positions of a plurality of display areas to display an item corresponding to a specific attribute. Also, the electronic apparatus 100 may change attribute information allocated to a specific display area based on a situation of the fulfillment center. The change of the attribute information may be performed based on at least one of attribute information of an item allocated to a specific area, attribute information of an item allocated to a location near the specific area, information on or regarding an item currently displayed in the specific area, and information on an item displayed in the nearby location. As such, by changing the attribute information of the item allocated in the specific area, the item display areas of the fulfillment center may be flexibly managed.

For example, a user (e.g., manager) may scan identification information attached to an exterior of the item using the user terminal 200 and provide the corresponding information to the electronic apparatus 100. The electronic apparatus 100 may identify one or more attribute types (and a representative attribute) of the item based on the identification information of the item and, from this, provide transport destination information and/or display position information of the item to the user terminal 200. Based on the provided information, the user may put the item in a predetermined tote to be moved or display the item in a specific display area.

For example, the electronic apparatus 100 may identify an attribute (e.g., a representative attribute) of a specific item from the beginning of a warehousing stage of the item and manage other items having the attribute (e.g., the representative attribute) as a group.

In addition, the electronic apparatus 100 may provide information on a plurality of candidate display positions for displaying the item to the user terminal 200. The user may display the item in one display area among the plurality of candidate display positions based on the candidate display position information output from the user terminal 200 and provide display position information to the electronic apparatus 100 by inputting, to the user terminal 200, position information of a specific display area in which the item is actually displayed among the plurality of candidate display positions.

Meanwhile, when the attribute (or representative attribute) of the item corresponds to an attribute related to a packing task of the item, the electronic apparatus 100 according to an example embodiment may provide information on the candidate display positions based on position information of a task zone related to the packing task of the item. For example, the electronic apparatus 100 may provide candidate display position information by recommending candidate display position(s) located within a predetermined distance from the task zone related to the packing task of the specific item in preference to other candidate display positions. In this regard, for the specific item having the packing task-related attribute, even if it does not correspond to the representative attribute of the item, the electronic apparatus 100 may provide a function of recommending a candidate display position near the packing task-related zone among candidate display positions corresponding to the representative attribute in preference to other candidate display positions.

According to another example embodiment, the electronic apparatus 100 may provide information on candidate display positions of the item based on the representative attribute of the item, but may preferentially recommend some display areas among the candidate display positions in further consideration of display position information of other displayed items. For example, the electronic apparatus 100 may distinguish between a display area occupied by other displayed items at a predetermined ratio or more and a display area that is not, among the candidate display positions (display areas) determined based on the representative attribute of the item. In this example, the electronic apparatus 100 may preferentially recommend the display area having a spare room for additionally displaying an item as the candidate display position information.

Figure 4:
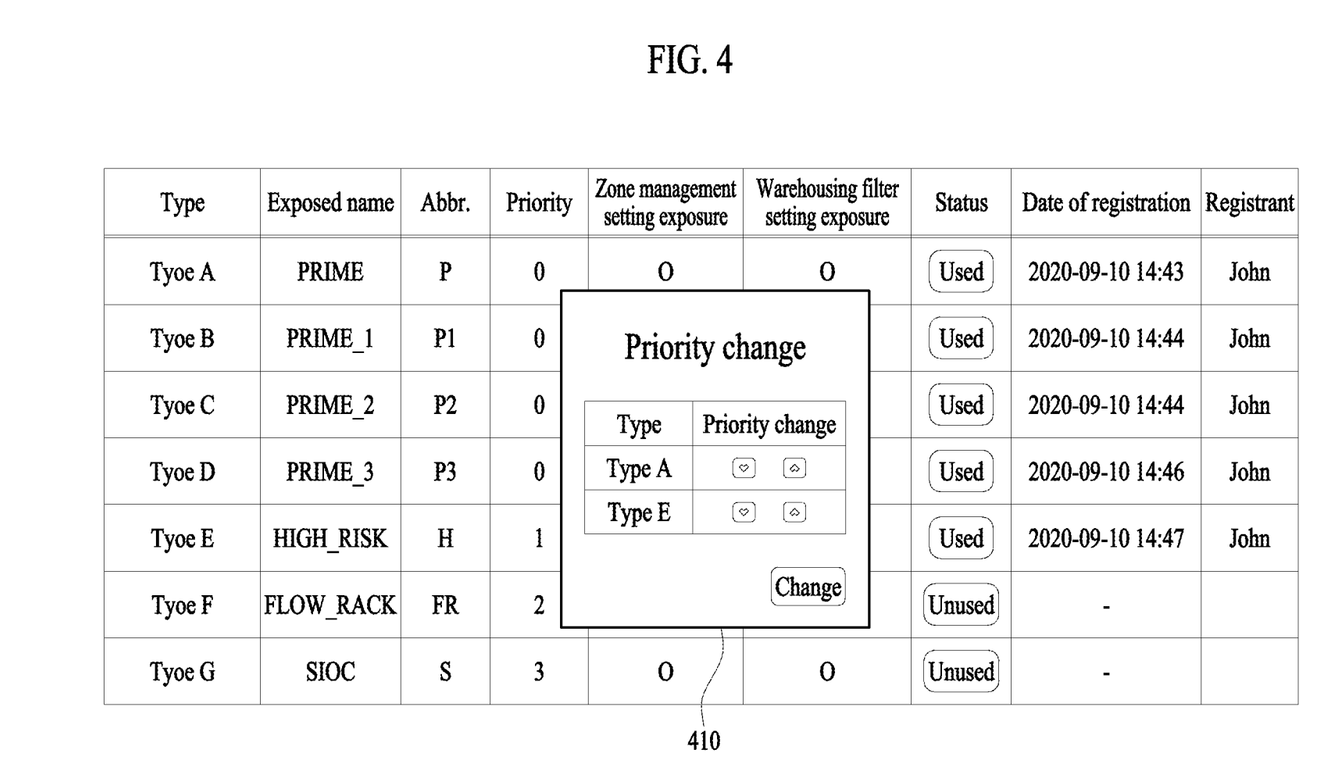
FIG. 4 is a diagram illustrating an item attribute-related condition setting screen of an electronic apparatus according to an example embodiment of the present disclosure.

FIG. 4 is a diagram illustrating a screen for setting an item attribute-related condition in the electronic apparatus 100 according to an example embodiment of the present disclosure.

Referring to FIG. 4, the electronic apparatus 100 according to an example embodiment may set an item attribute-related condition to be managed in a specific fulfillment center through a user input.

The electronic apparatus 100 may provide information on at least one preset item attribute type (e.g., Type A through Type G) through the user terminal 200. For example, a user (e.g., a manager) may identify an item attribute type (e.g., Type A through Type G) exposed through the user terminal 200. Also, the user may provide, to the electronic apparatus 100, a user input of determining at least a portion (e.g., Type A through Type E) of the exposed item attribute type as an attribute to be used in the corresponding fulfillment center or determining at least a portion (e.g., Type F and Type G) as an attribute not to be used in the corresponding fulfillment center. In response to the user input, the electronic apparatus 100 may determine an item attribute type (e.g., Type A through Type E) to be managed in the corresponding fulfillment center.

Also, the electronic apparatus 100 may receive a user input of additionally setting a new item attribute aside from the at least one preset item attribute type (e.g., Type A through Type G). In response to the user input, the electronic apparatus 100 may additionally display a field of a new item attribute type (not shown) on the screen.

Meanwhile, the electronic apparatus 100 may determine item attribute types (e.g., Type A through Type E) to be used in the specific fulfillment center and then, through a user input, set priorities of the item attribute types.

For example, the electronic apparatus 100 may display priority information (e.g., 0, 1, 2, 3, etc.) of preset item attribute types on an item attribute setting screen. Also, the electronic apparatus 100 may additionally provide a field for changing the predetermined priority information on the screen, thereby changing and setting priority information of each item attribute based on user input information applied to the field 410.

Meanwhile, the electronic apparatus 100 according to an example embodiment may individually set a task stage to which an item attribute-related condition is to be applied for each item attribute type.

Even if a specific item attribute type is determined as an attribute to be used in the corresponding fulfillment center, the electronic apparatus 100 may set the item attribute type not to be exposed on an attribute condition setting screen (for example, an attribute condition setting (e.g., warehousing filter setting) screen of a warehousing stage or an attribute condition setting (e.g., zone management setting) screen of the displaying stage) of a certain stage.

Although not shown in FIG. 4, the electronic apparatus 100 may also determine whether each item attribute type is to be used at the displaying stage in which zone (e.g., a station) in the fulfillment center. For example, the electronic apparatus 100 may determine that an attribute of one type (e.g., Type E (High risk)) is to be used as a setting condition at each of a displaying stage in a buffer zone and a displaying stage in a picking zone. Also, the electronic apparatus 100 may determine that an attribute of another type (e.g., Type F (flow rack)) is to be used as a setting condition only at the stage of displaying in the picking zone and is not to be used at the stage of displaying in the buffer zone.

Meanwhile, in response to whether to use a specific item attribute type being determined in the example of FIG. 4, the electronic apparatus 100 according to various example embodiments may provide a list of item attribute types such that a predetermined detailed condition is set based on the determined item setting type when setting an attribute condition (e.g., setting a warehousing filter, refer to FIG. 6) at the stage of warehousing stage described below, or when setting an attribute condition (e.g., setting a zone management, refer to FIG. 5) at the stage of displaying.

Meanwhile, in the example embodiment, the electronic apparatus 100 may additionally set a type of a task performed in the corresponding display location. For example, a position in which the item is displayed may be set as a place for packing and may also be set as a position of a buffer zone in which the item is temporarily displayed after being received so as to be moved to such area.

Figure 5:
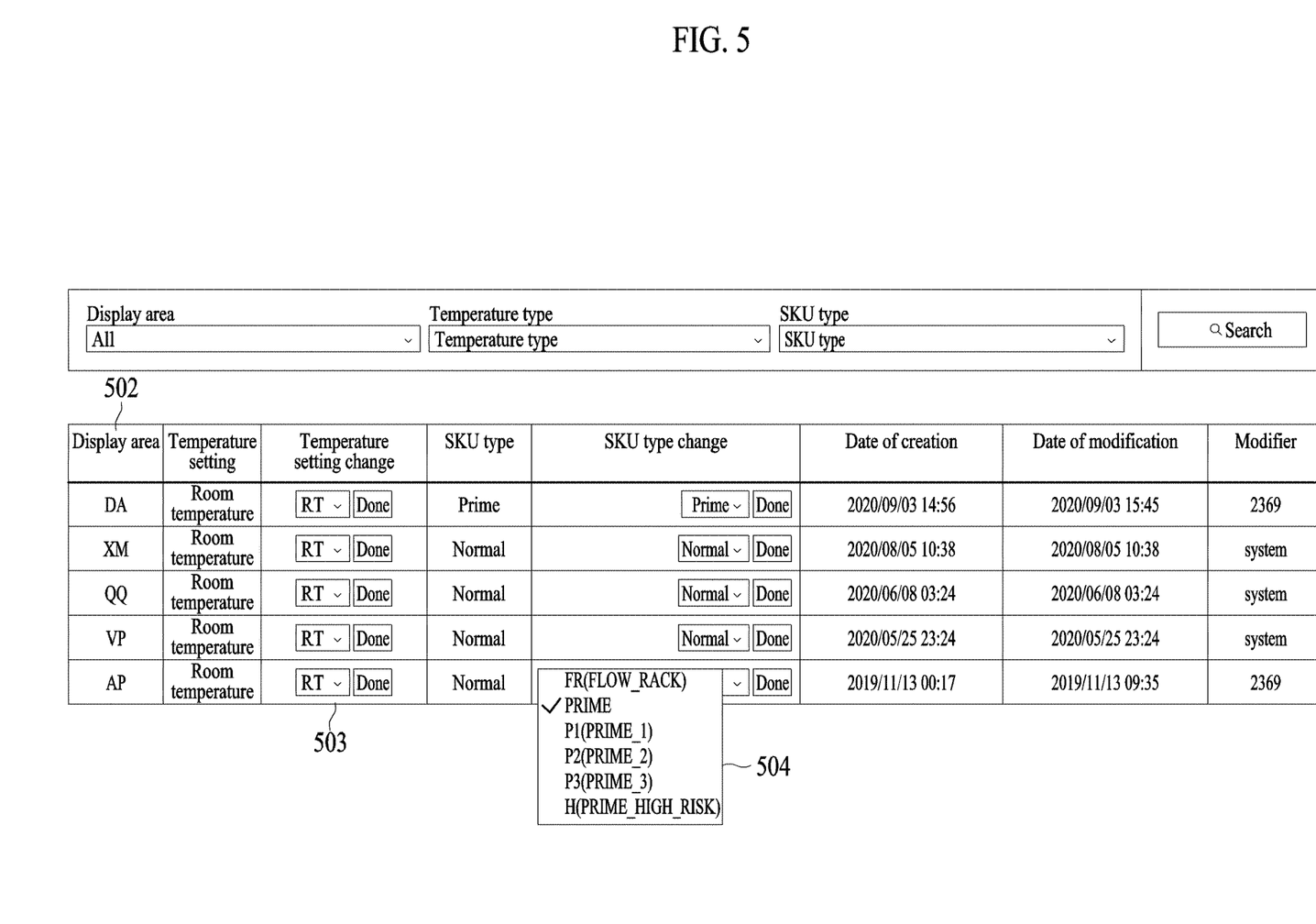
FIG. 5 is a diagram illustrating an item attribute-related condition setting screen of an electronic apparatus according to an example embodiment of the present disclosure.

FIG. 5 is a diagram illustrating an item attribute-related condition setting screen of the electronic apparatus 100 according to an example embodiment of the present disclosure. For example, FIG. 5 may correspond to a screen for setting an attribute condition related to a displaying stage of an item.

Referring to FIG. 5, the electronic apparatus 100 according to an example embodiment may map information on at least one item attribute type (e.g., an SKU type) to each of a plurality of display areas (e.g., zone DA, zone XM, zone QQ, zone VP, and zone AP of FIG. 5) 502 included in a specific fulfillment center, store mapping information in a database, and manage the stored mapping information.

As illustrated in FIG. 5, the electronic apparatus 100 may designate at least one item attribute type corresponding to each of the display areas (e.g., DA, XM, VP, AP) 502 included in the specific fulfillment center. In this case, the electronic apparatus 100 may expose, on the screen, an item attribute type list 504 including at least some items (e.g., SKU) determined to be used in the corresponding fulfillment center as described with reference to FIG. 4. Also, the electronic apparatus 100 may register one of attribute types included in the item attribute type list 504 as an attribute type corresponding to a specific display area. Through this, the electronic apparatus 100 may set an attribute type of an item to be stowed in each display area.

As an example, the electronic apparatus 100 may set a display-related condition such that only an item having an attribute of a predetermined type in a predetermined display area is displayed. As another example, the electronic apparatus 100 may set a plurality of attribute types mapped to one display area such that an item having an attribute of a first type or an item having an attribute of a second type is displayed in a certain display area.

Meanwhile, according to an example embodiment, the electronic apparatus 100 may provide and manage a separate setting field 503 in association with a storage temperature attribute for each of the display areas 502. For example, the electronic apparatus 100 may individually set a storage temperature-related attribute regarding whether an item is to be stored at room temperature or refrigerated (or frozen) in each of the display areas 502. However, the present embodiments are not to be taken as being limited thereto. According to another example embodiment, the electronic apparatus 100 may manage each display area by providing a separate setting field for a certain attribute type to be managed as a main attribute among item attribute types in addition to the storage temperature attribute. Also, the storage temperature-related attribute may also be exposed as one item attribute type included in the item attribute type list 504.

Figure 6:
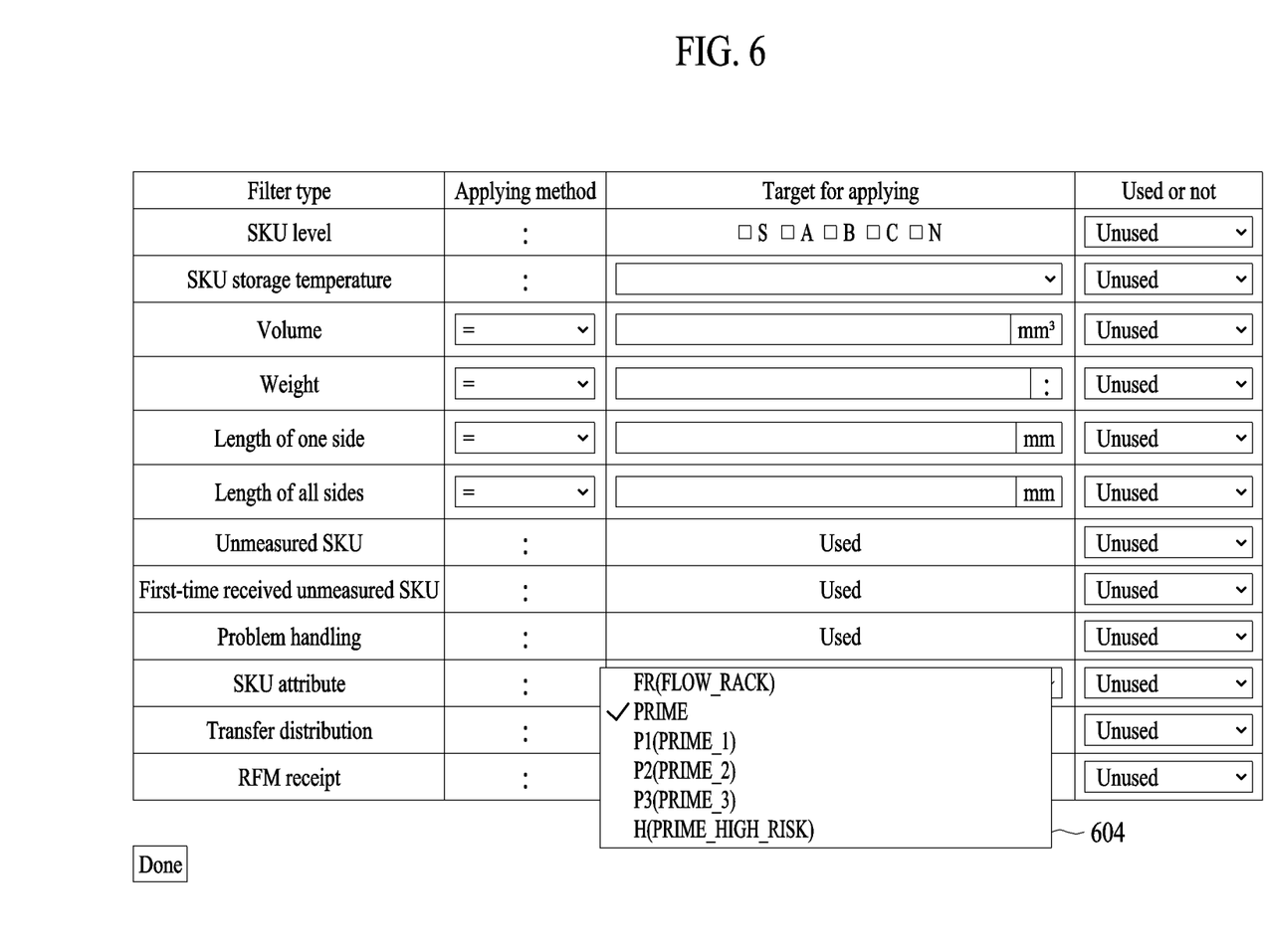
FIG. 6 is a diagram illustrating an item attribute-related condition setting screen of an electronic apparatus according to an example embodiment of the present disclosure.

FIG. 6 is a diagram illustrating an item attribute-related condition setting screen of the electronic apparatus 100 according to an example embodiment of the present disclosure. For example, FIG. 6 may correspond to a screen for setting an attribute condition related to a stage of warehousing an item.

Referring to FIG. 6, the electronic apparatus 100 according to an example embodiment may set a predetermined item attribute condition at the stage of warehousing such that items unloaded at a specific fulfillment center are classified based on attributes of the items and warehoused therein.

For example, the electronic apparatus 100 may filter the items received in the corresponding fulfillment center based on a specific warehousing condition so that an item satisfying the condition is separately managed. For this, the electronic apparatus 100 may set one or more warehousing filters provided based on a predetermined condition and provide warehousing-related information to a user using the set warehousing filter(s) at the warehousing stage of the item.

According to an example embodiment, the electronic apparatus 100 may expose, on a screen, an item attribute type list 604 set to be used in the corresponding fulfillment center and set an attribute condition for a specific warehousing filter based on a user input of selecting at least one attribute type (e.g., a PRIME attribute) from the item attribute type list 604. For example, a first warehousing filter may be set to correspond to the PRIME attribute. In this example, when an item is to be warehoused using the first warehousing filter at the warehousing stage, the electronic apparatus 100 may provide tote-related information by distinguishing at least one item corresponding to the PRIME attribute from items of other attributes among various items.

For example, an operator who is in charge of warehousing items at the warehousing stage may add an item to the same tote along with other items corresponding to the PRIME attribute based on tote-related information (e.g., tote destination information) of each item provided from the electronic apparatus 100 and transport the tote to a destination for a subsequent task.

Meanwhile, as illustrated in FIG. 6, in a case of some attribute types (e.g., an item (or SKU) level attribute, an item (or SKU) storage temperature attribute, an item volume, weight, length-related attribute, an attribute regarding whether an item is a target to be transferred, etc.), the electronic apparatus 100 according to an example embodiment may expose the corresponding attribute type as a separate field on the screen instead of using a manner of selecting a specific attribute type from the item attribute type list 604 such that a detailed reference related to a condition of each warehousing filter is set. In this case, an attribute type exposed as a separate field and an attribute type exposed in the item attribute type list 604 are not limited as being illustrated in FIG. 6. It would be apparent to those skilled in the art that an attribute type can be provided in a form easy for condition setting in various ways based on a selection of a user (e.g., manager).

Figure 7:
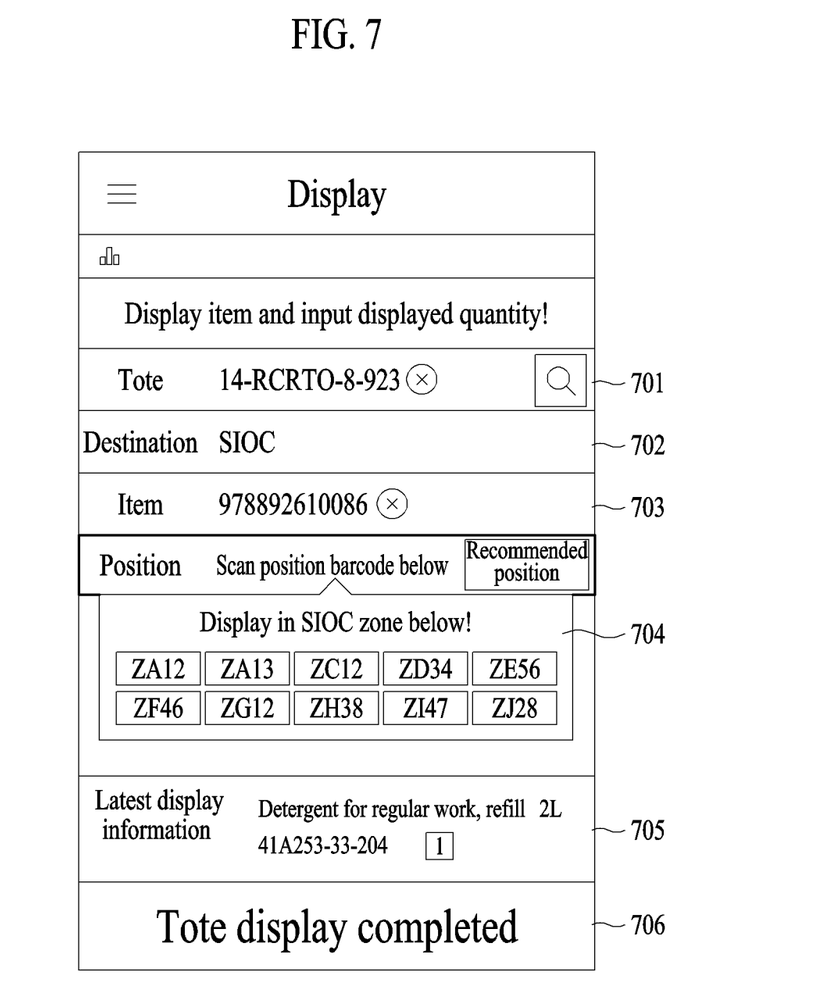
FIG. 7 is a diagram illustrating a screen for providing information in an electronic apparatus according to an example embodiment of the present disclosure.

FIG. 7 is a diagram illustrating a screen for providing information in the electronic apparatus 100 according to an example embodiment of the present disclosure.

Referring to FIG. 7, the electronic apparatus 100 according to various example embodiments may acquire identification information (first information) 701 (e.g., "14-9RCRT0-8-923") on a tote containing a specific item and acquire identification information (second information) 703 (e.g., "978892610086") on the item. Based on the identification information 701 and 703 on the item, the electronic apparatus 100 may provide tote destination information 702 (e.g., "SIOC") and candidate display position information 704 (e.g., "ZA12" through "ZJ28").

For example, in a stage of displaying an item, a user (e.g., an operator) may use the user terminal 200 to input the identification information 701 attached to an exterior of a tote corresponding to a target of a task. As a result, the user may identify the tote destination information 702 (e.g., SIOC) corresponding to the tote. For example, starting from a stage of warehousing, items having an attribute "SIOC" may be guided by the electronic apparatus 100 so as to be accommodated in a tote of which tote destination information corresponds to "SIOC."

The user may scan identification information of a specific item (e.g., goods, product, SKU) included in the tote using the user terminal 200. As a result, the user may identify the candidate display position information 704 for displaying the item. Respective display areas included in the fulfillment center may be mapped to corresponding item attribute types. For example, candidate display positions recommended in accordance with the identification information of the item being input may be fully mapped based on attributes (or representative attributes) of the corresponding item. The user may display the item in a display area corresponding to one of the plurality of candidate display positions provided.

The user may input, through the user terminal 200, position information of a display area in which the item is actually displayed among the plurality of candidate display positions displayed. Based on the input information, the electronic apparatus 100 may store information indicating that the item is displayed in the display area. Meanwhile, when a display task of the specific item is completed as described above, the electronic apparatus 100 according to an example embodiment may provide display information of the item on which the display task is completed, as latest display information 705.

After all items included in a currently handled tote are displayed, the user may complete the display task of the tote through a display completion field 706 of the tote.

Figure 8:
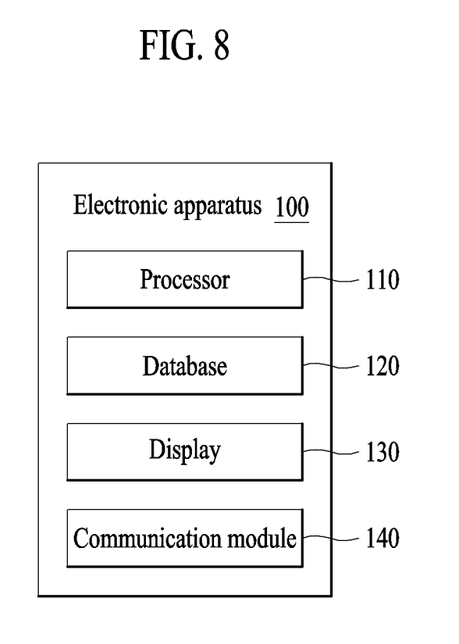
FIG. 8 is a block diagram illustrating an electronic apparatus according to an example embodiment of the present disclosure.

FIG. 8 is a block diagram illustrating an electronic apparatus according to an example embodiment of the present disclosure.

Referring to FIG. 8, the electronic apparatus 100 (e.g., server) according to various example embodiments may include at least one of a processor 110, a database 120, a display 130, and a communication module 140.

The processor 110 may process a series of operations for performing a logistics information managing method according to example embodiments of the present disclosure. The processor 110 may control other components of the electronic apparatus 100 overall.

For example, the processor 110 may set an item attribute-related condition for each fulfillment center, identify an attribute or representative attribute of a specific item based on the item attribute-related condition, and provide candidate display position information of a position to which the item is to be displayed based on the attribute or representative attribute.

For example, based on the item attribute-related condition, when the item has a plurality of attributes, the processor 110 may identify a representative attribute of the item based on priority information of the attributes and provide candidate display position information corresponding to the representative attribute.

In addition, the processor 110 may provide tote-related information (e.g., tote destination information) such that respective items are classified and moved based on the same attribute (or representative attribute) based on the item attribute-related condition even in a stage of receiving the items.

According to various example embodiments, an item attribute type may include a storage temperature-related attribute of an item, a size (or volume, weight, etc.)-related attribute of the item, a sales-related attribute of the item, or a packing-related attribute of the item. In addition, the item attribute type may further include a transfer distribution target attribute related to whether the corresponding item corresponds to a target to be transferred to another fulfillment center.

When the attribute (or representative attribute) of the item is related to a packing task of the item, based on a task zone related to the packing task of the item, the processor 110 according to various example embodiments may provide candidate display position information of a predetermined display area adjacent to the task zone. As another example, the processor 110 may provide the candidate display position information based on displayed state information of other displayed items.

In addition, the processor 110 may execute various functions related to the above-described logistics management according to example embodiments of the present disclosure.

The database 120 may be a data structure implemented in a predetermined storage space of the electronic apparatus 100, where functions such as storing, searching, deleting, editing, or adding data are freely performed. For example, the database 120 may have fields or components for processing functions such as storing, searching, deleting, editing, or adding data.

The database 120 may store data related to various functions of the electronic apparatus 100. For example, the database 120 may store various information (e.g., set item attribute condition information, etc.) associated with a fulfillment center, and in addition, may store instructions or data for an execution operation of the processor 120.

The display 130 may display various information associated with an operation of the electronic apparatus 100. For example, the display 130 may display an item attribute-related condition setting screen or a screen showing tote destination information and/or candidate display position information provided by the electronic apparatus 100. In some cases, the electronic apparatus 100 may not include the display 130. In such cases, the electronic apparatus 100 may provide display information by transmitting the information to be displayed to another device (e.g., the user terminal 200) through the communication module 140, so that the information is displayed on a display included in the other device.

The communication module 140 may perform a function of transmitting information stored in the database 120 of the electronic apparatus 100 or predetermined information processed by the processor 110 to another device, or receiving predetermined information from another device into the electronic apparatus 100. For example, the communication module 140 may receive predetermined user input information from the user terminal 200. In the example embodiment, the communication module 140 may include a transceiver for transmitting and receiving information.

The present specification and drawings have been described with respect to the example embodiments of the present disclosure. Although specific terms are used, it is only used in a general sense to easily explain the technical content of the present disclosure and to help the understanding of the invention, and is not intended to limit the scope of the specification. It will be apparent to those skilled in the art that other modifications based on the technical spirit of the present disclosure may be implemented in addition to the embodiments disclosed herein.

The electronic apparatus or terminal in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. A logistics information managing method comprising:
receiving data indicating one or more operational characteristics associated with a fulfillment center;

setting, based on the one or more operational characteristics, an item attribute-related condition corresponding to the fulfillment center, wherein the item attribute-related condition comprises a priority list listing a plurality of attribute types, and wherein each attribute type, of the plurality of attribute types, is assigned a priority value;

identifying one or more attribute types, of the plurality of attribute types, associated with a first item located in a geographical area within the fulfillment center;

determining, based on the priority list and one of the one or more attribute types, a representative attribute of the first item; and providing candidate display position information for the first item based on the representative attribute, wherein the candidate display position information indicates one or more candidate display positions, wherein each of the one or more candidate display positions corresponds to a second geographical area within the fulfillment center; and causing the first item to be relocated, by a transportation device, to at least one of the one or more candidate display positions within the fulfillment center.

2. The logistics information managing method of claim 1, further comprising:

identifying information regarding representative attributes allocated to a specific display area and a position adjacent to the specific display area; and changing the representative attribute to be allocated to the specific display area based on at least a portion of the allocated representative attributes.

3. The logistics information managing method of claim 1, further comprising:

providing, according to a type of a task performed in the display area, at least one of:
 displayable attribute type information associated with at least a portion of a display area of the fulfillment center or
 setting information.

4. The logistics information managing method of claim 1, wherein the determining one of the one or more attribute types of the first item to be the representative attribute comprises:

determining the representative attribute of the first item is based on priority information of item attribute types included in the item attribute-related condition.

5. The logistics information managing method of claim 1, wherein the one or more attribute types of the first item comprises at least one of a storage temperature-related attribute of the first item, a size-related attribute of the first item, a sales-related attribute of the first item, or a packing task-related attribute of the first item.

6. The logistics information managing method of claim 1, wherein the providing of the candidate display position information for the first item comprises:

providing candidate display position information for a position to which the first item is to be displayed based on a position of a task zone related to a packing task of the first item.

7. The logistics information managing method of claim 1, wherein the providing of the candidate display position information for the first item comprises:

providing candidate display position information for a position to which the first item is to be displayed based on display information for displayed items.

8. The logistics information managing method of claim 1, wherein the setting of the item attribute-related condition comprises:

determining, based on a user input, item attribute types corresponding to the fulfillment center and a priority for the item attribute types.

9. The logistics information managing method of claim 8, wherein the setting of the item attribute-related condition further comprises:

matching at least one of the item attribute types to each display area included in the fulfillment center.

10. The logistics information managing method of claim 1, wherein the setting of the item attribute-related condition further comprises:

determining at least one task stage to which the item attribute-related condition is to be applied among a plurality of item task stages performed in the fulfillment center.

11. The logistics information managing method of claim 1, further comprising:

providing tote-related information such that the first item is accommodated in a tote corresponding to the representative attribute.

12. An electronic apparatus comprising:
a database;
a communication module; and
a processor,
wherein the processor is configured to:
 receive data indicating one or more operational characteristics associated with a fulfillment center;
 set, based on the one or more operational characteristics, an item attribute-related condition corresponding to the fulfillment center, wherein the item attribute-related condition comprises a priority list listing a plurality of attribute types, and wherein each attribute type, of the plurality of attribute types, is assigned a priority value;
 identify one or more attribute types, of the plurality of attribute types, associated with a first item located in a geographical area within the fulfillment center;
 determine, based on the priority list and one of the one or more attribute types, a representative attribute of the first item; and
 providing candidate display position information for the first item based on the representative attribute, wherein the candidate display position information indicates one or more candidate display positions, wherein each of the one or more candidate display positions corresponds to a second geographical area within the fulfillment center; and
 cause the first item to be relocated, by a transportation device, to at least one of the one or more candidate display positions within the fulfillment center.

13. The electronic apparatus of claim 12, wherein the processor is configured to determine the representative attribute of the first item is based on priority information of item attribute types included in the item attribute-related condition.

14. The electronic apparatus of claim 12, wherein the processor is configured to provide candidate display position information for a position to which the first item is to be displayed based on a position of a task zone related to a packing task of the first item.

15. The electronic apparatus of claim 12, wherein the processor is configured to provide candidate display position information for a position to which the first item is to be displayed based on display position information for displayed items.

16. The electronic apparatus of claim 12, wherein the processor is configured to determine at least one task stage to which the item attribute-related condition is to be applied among a plurality of item task stages performed in the fulfillment center.

17. A non-transitory computer-readable recording medium comprising a computer program for performing a logistics information managing method, the logistics information managing method comprising:

receiving data indicating one or more operational characteristics associated with a fulfillment center;

setting, based on the one or more operational characteristics, an item attribute-related condition corresponding to the fulfillment center, wherein the item attribute-related condition comprises a priority list listing a plurality of attribute types, and wherein each attribute type, of the plurality of attribute types, is assigned a priority value;

identifying one or more attribute types, of the plurality of attribute types, associated with a first item located in a geographical area with the fulfillment center;

determining, based on the priority list and one of the one or more attribute types, a representative attribute of the first item; and providing candidate display position information for the first item based on the representative attribute, wherein the candidate display position information indicates one or more candidate display positions, wherein each of the one or more candidate display positions corresponds to a second geographical area within the fulfillment center; and causing the first item to be relocated, by a transportation device, to at least one of the one or more candidate display positions within the fulfillment center.

18. The logistics information managing method of claim 1, wherein the one or more operational characteristics comprises operational methods of handling or storing logistics items.

19. The logistics information managing method of claim 1, wherein the one or more operational characteristics is associated with a size of the fulfillment center or an operation purpose of the fulfillment center.

* * * * *